United States Patent [19]

Violo et al.

[11] Patent Number: 4,948,220
[45] Date of Patent: Aug. 14, 1990

[54] MODULE FOR DISTRIBUTING AND CONNECTING OPTICAL FIBERS

[75] Inventors: Robert D. Violo, Villejuie; Robert Calevo, L'Hay les Roses; Didier, M. Suillerot, Paris, all of France

[73] Assignee: Societe Anonyme de Telecommunications, Paris, France

[21] Appl. No.: 367,037

[22] Filed: Jun. 16, 1989

[30] Foreign Application Priority Data

Jun. 20, 1988 [FR] France .................. 88 08237

[51] Int. Cl.$^5$ .............................................. G02B 6/36
[52] U.S. Cl. .................................................... 350/96.2
[58] Field of Search .................... 350/96.2, 96.21, 96.1, 350/96.24

[56] References Cited

U.S. PATENT DOCUMENTS

| | | | |
|---|---|---|---|
| 4,373,776 | 2/1983 | Purdy | 350/96.2 |
| 4,595,255 | 6/1986 | Bhatt et al. | 350/96.2 |
| 4,708,430 | 11/1987 | Donaldson et al. | 350/96.2 |
| 4,765,710 | 8/1988 | Burmeister et al. | 350/96.2 |
| 4,767,709 | 8/1988 | Suillernt et al. | 350/96.2 |
| 4,795,230 | 1/1989 | Garcia et al. | 350/96.2 |
| 4,818,054 | 4/1989 | George et al. | 350/96.2 |
| 4,824,196 | 4/1989 | Bylander | 350/96.2 |
| 4,832,436 | 5/1989 | Goto et al. | 350/96.2 |

FOREIGN PATENT DOCUMENTS

| | | |
|---|---|---|
| 0146478 | 6/1985 | European Pat. Off. . |
| 0215668 | 3/1987 | European Pat. Off. . |
| 59-102208 | 6/1984 | Japan ................. 350/96.2 |

Primary Examiner—William L. Sikes
Assistant Examiner—John Ngo
Attorney, Agent, or Firm—Laubscher, Presta & Laubscher

[57] ABSTRACT

In a box having an openable front face, plural fiber loop supports substantially flat and movable can be laid out parallel with the front face of the box. Connector bars are respectively attached to the supports and are used for two by two connecting the optical fibers. Slides on sliding rails attached in the box enable the supports to be translated together substantially perpendicular to the front face and completely outside the box. A support-bearing rod is rotatively mounted between the slides so as to turn the supports together outside the box and around an axis of rotation substantially parallel with the front face. The inside of the box is then accessible. Each of the supports can pivot around an axis perpendicular to the support so as to be cleared away from the other supports.

15 Claims, 3 Drawing Sheets

MODULE FOR DISTRIBUTING AND CONNECTING OPTICAL FIBERS

BACKGROUND OF THE INVENTION

1. Field of the invention

This invention relates to a module of the parallelepipedal box type with an openable front face and containing several parallel and mobile supports, called cases, for supporting purposes, coiled optical fiber loops and fiber connectors.

For example the module can constitute a junction box in a cable-television distribution network so as to connect first optical fibers emerging from plural elementary cables of a multiple cable connected to a teledistribution central station, to second fibers connected with videocommunication installations in subscriber's homes. The module thereby serves, on one hand, to protect the different connections between fibers, and, on the other hand, to dispose of fiber loops required for the preparation, repair and modification of the connections between fibers. Such a module is very often attached to a vertical column in a building and, by its very nature, must not be voluminous, while enabling access to fiber loops situated at the side of the supports and manipulation of the connectors.

2. Description of the Prior Art

According to European patent application No. 0,146,478, three different assemblies of rectangular supports in the box are envisaged. The box comprises an openable front face through which the supports can be displaced one by one towards the outside of the box. According to a first assembly, the supports are laid out perpendicular to the front face of the box, and are individually pivotable around an axis which is parallel with the front face and perpendicular to the supports and to the two longitudinal sidewalls of the box. The first assembly is also envisaged in European patent application No. 0,215,668—corresponding to U.S. Pat. No. 4,792,203—which deals with supports having only one fiber-to-fiber connector, completed by a spare connector and a connector with one intermediary fiber, called a jumper. According to a second assembly, the supports are laid out parallel with the front face of the box, and are respectively pivotable around individual axes of rotation which are parallel with the front face and are located along longitudinal edges of the supports and aligned on a plane that is oblique to the front face of the box. Finally, according to a third assembly, the supports are each mounted slidably and perpendicular to the front face of the box.

By definition, the front face of the box is directly accessible to an operator, especially when a rear face of the box which is parallel with the front face, is fixed to a wall along which are channelled the cables and, if necessary, individual optical fibers. Consequently, for the three support assemblies disclosed in European patent application No. 0,146,478, extraction of one of the supports towards the outside of the box by pivoting, or rotation, or sliding, makes access to the inside of the box very difficult, particularly to the rear face of the box where the fibers are fanned out from cables. In fact, the gap between the supports should be small so as to reduce the bulkiness of the box. The operator's fingers cannot then reach the bottom of the box without risking involuntarily disconnecting fibers or weakening the optical fibers by pinching or twisting them.

For these reasons, a similar support embodying European patent application No. 0,146,478 does not support loops of first fibers coming from a same first cable and loops of second fibers coming from a same second cable and the connectors supported by the support only connect the aforesaid fibers, and not fibers coming from other cables or supports.

Furthermore, when the box only comprises a small number of supports, e.g. 2 to 5 supports, the thickness of the supports when stacked is less than the width or length of the supports to the extent that it is preferable to lay out the supports parallel with the wall and therefore to the openable front face in the box, in order to restrict the thickness of the box, particularly when the box is located in a corridor. Such a laying out of supports is in keeping with the second assembly according to FIGS. 2a and 2b of European patent application No. 0,146,478. However, this second assembly provides, beyond the above mentioned drawbacks, very difficult access to supports with pivoting axes that are far away from the front face and therefore close to the rear face of the box, and a dimension following a direction parallel with the box faces and therefore perpendicular to the pivoting axis that is greater than necessary, since the individual pivoting axes are substantially disposed on a plane that is oblique to the faces of the box.

OBJECT OF THE INVENTION

The main object of this invention is to remedy the above mentioned drawbacks.

Another object of the invention is to provide a module in a box of which the loop and fiber connector supports are laid out parallel with the front and rear faces, but are extractable from the box in such a way as to provide easy access to the bottom of the box, towards the rear face.

A further object of this invention is to enable several supports to be manipulated together outside the box and to have individual access to the fiber loop case faces of each support, though the other supports are outside the box.

SUMMARY OF THE INVENTION

Accordingly, there is provided a module for distributing and connecting first and second optical fibers. The module is a box with an openable front face that includes plural fiber loop supports substantially flat and movable which are laid out parallel with the front face, plural means respectively attached to the supports for connecting the first optical fibers to the second optical fibers, respectively, translating means slidably mounted in the box for translating the supports together substantially perpendicular to the front face, from the inside to the outside of the box, and turning means rotatively mounted on the translating means, for turning the supports together towards the outside of the box and around an axis of rotation substantially parallel with the front face.

Each of the supports is pivotably mounted on the turning means around a pivoting axis perpendicular to the support.

The translating means is preferably two slides sliding on two upper and lower sliding rails attached to the inside of the box and perpendicular to the front face. The purpose of the translating means is to enable all the supports to be transported simultaneously outside and in front of the front face of the box, thereby making the rear face accessible and particularly the ends of the optical fiber cables which are maintained by known spreading heads on one sidewall or on the rear face of the box.

Furthermore, according to the invention, the module comprises means for storing fiber spare loops between the spreading heads and the supports. Advantageously, the storing means is translatable with the supports, and therefore attached to the means for turning, so as to easily coil the fibers outside the box and in compartments provided to this effect in the storing means.

Once the supports are translated outside the box, the turning means enables the supports to be oriented, so that the connectors are facing the operator and perpendicular to the front face of the box, and that at least one of the supports is pivotable on a plane perpendicular to the front face and going away from it, and thus be laterally cleared away from the other supports.

BRIEF DESCRIPTION OF THE DRAWING

The foregoing and other objects, features and advantages of the invention will be apparent from the following detailed description of several embodiments of the invention with reference to the corresponding accompanying drawings in which.

DESCRIPTION OF THE PREFERRED EMBODIMENTS

An optical fiber distributing and connecting unit module is adapted to receive first optical fibers Fe, called incoming fibers, coming from unsheathed ends of at least one incoming cable Ce, thereby respectively connecting them two by two to second optical fibers Fs, called outgoing fibers, of at least one outgoing cable Cs. The incoming fibers Fe come from videotransmission or distribution stations or automatic exchanges for example and have ends to be plugged into the first semi-connectors 224e of any identifiable connectors, as will be seen further on. On the other hand, the outgoing fibers Fs are usually intended to connect subscriber equipments and installations and their number varies depending on operating requirements and geographical grouping of the subscribers.

According to a preferred embodiment of the invention, each of the cables Ce and Cs comprises ten optical fibers, and the module is intended to connect the optical fibers Fe of three incoming cables Ce to the optical fibers Fs of three outgoing cables Cs. A fiber Fe may theoretically be connected to any outgoing fiber Fs. However, other cable and optical fiber distributions can be envisaged. The invention applies to all combinations of cables, including multiple cables comprising a plurality of optical fiber elementary cables grouped helically in a sheathing. An elementary cable can be of the helically grooved split-ring type or of the tube type, possibly reinforced by a central carrier armature. The fibers can be buried in grease to protect them against humidity. These various combinations can be of the same type as those disclosed in U.S. Patent No. 4,765,709.

Figure 1:
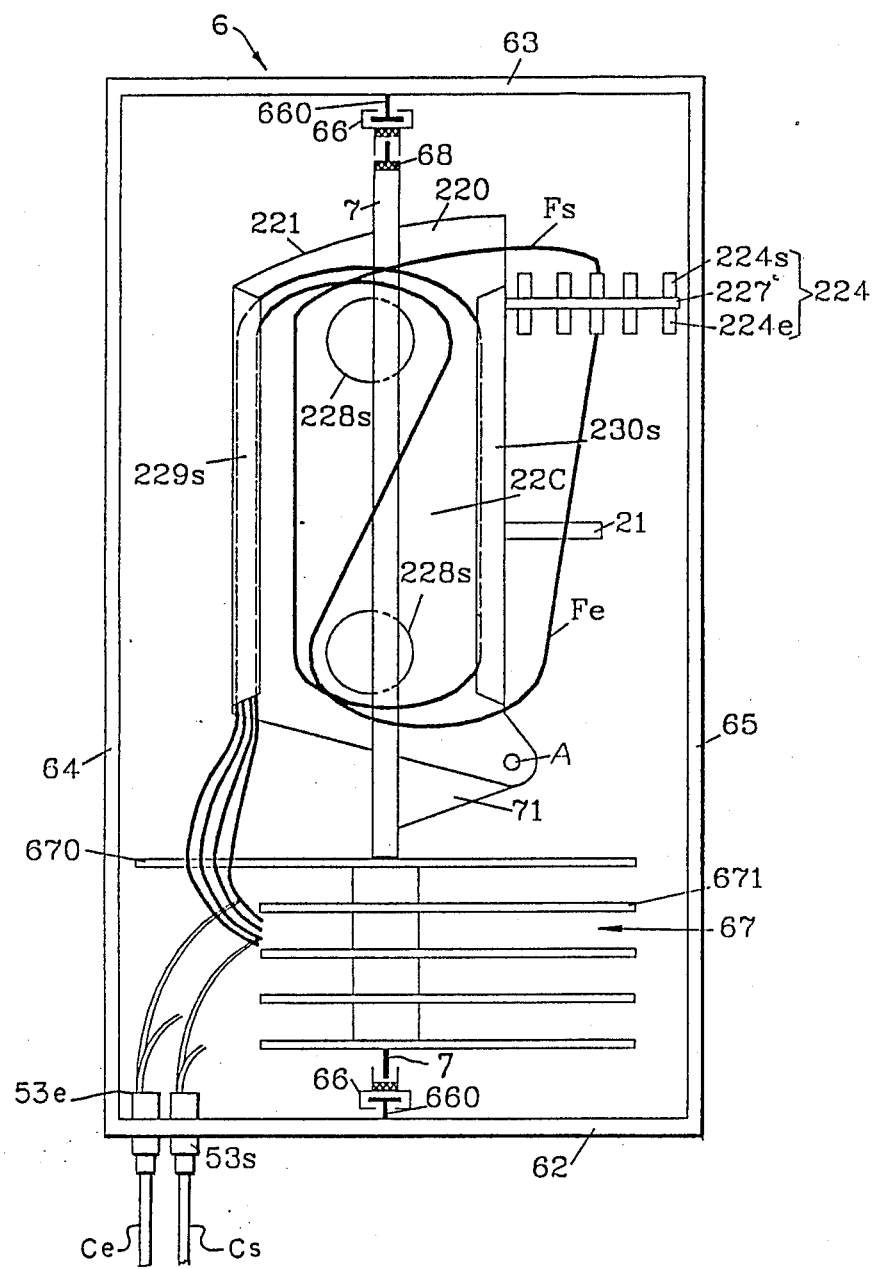
FIG. 1 is a vertical front view of an optical fiber distributing and connecting module box embodying the invention.
Figure 2:
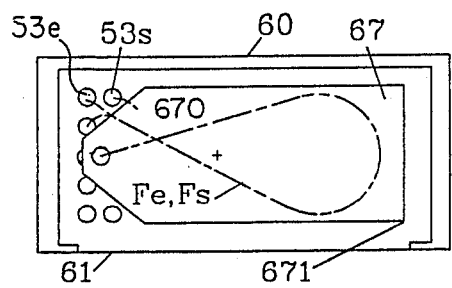
FIG. 2 is a top view of compartments of the module for spare fiber loops, located in the lower part of the module.
Figure 3:
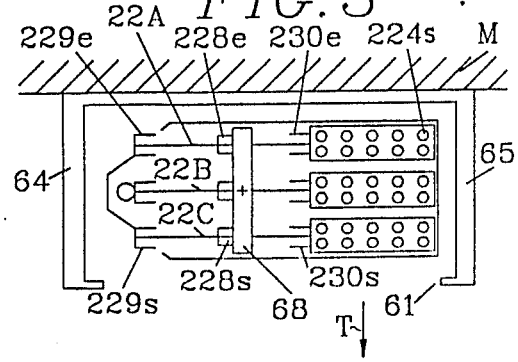
FIG. 3 is a top view of fiber coil loop case and connector supports, laid out in the upper part of the module box.

In reference to Figs. 1 to 3, the module is in the form of a parallelepipedal box 6 having a major rear face 60 hung vertically on a wall or bulkhead M, a major front face 61 comprised of a cover which is either removable or pivotable towards the outside, upper and lower horizontal sidewalls 62 and 63, and longitudinal vertical sidewalls 64 and 65. The box 6 comprises essentially, in the upper portion, three supports 22A, 22B and 22C for optical fiber coiling loops and fiber-to-fiber connectors, and, in the lower portion, several compartments 67 for storage of spare loops of optical fibers Fe and Fs fanning out from cables Ce and Cs.

As all the supports 22A, 22B and 22C are identical, one of them, such as the support 22C, is described in detail hereafter when it is enclosed in the box 6. This support is comprised of a substantially quadrilateral plate sector 220 and is, in particular, cut out according to an isosceles trapezoid with minor and major bases extending vertically and respectively facing longitudinal box sidewalls 64 and 65. When it is completely enclosed in the box 6, the support 22C is parallel with the major faces 60 and 61 of the box. The support 22C is pivotable around a small horizontal axis A. The axis A is perpendicular to the Plate sector 220 and located in a lower corner of the trapezoidal sector 220 near the major base of the trapezoid.

Opposite the pivoting axis A and at a predetermined distance from this pivoting axis along the major base of the trapezoidal sector, a connector-holder 227 is attached perpendicular to the major base of the support 22C. For example the connector-holder 227 is a bar soldered to the support 22C and has two rows of fiber-to-fiber connectors aligned parallel with the plane of the support 22C and on both sides of it. Here, the connector-holder 227 has two rows of five connectors 224 each, though in practice, approximately twenty connectors can be planned. According to the embodiment shown in FIG. 1, each of the connectors comprises two semi-connectors 224e and 224s colinear according to a vertical axis of alignment to connect an end of an incoming optical fiber Fe to an end of an outgoing optical fiber Fs. The axis of alignment of the two semi-connectors is disposed transversely to the connector-holder 227 and therefore parallel with the major base of the support 22C. The connectors 224 are slidably mounted or attached by screws, or locking or any other known means on the connector-holder 227. Each of the semi-connectors 224e and 224s in a connector 224 includes known longitudinal means for abutting and aligning the end of an optical fiber Fe, Fs with an end of an optical fiber Fs, Fe. It will be presumed hereafter that the semi-connectors 224s are disposed above the semi-connectors 224e. Furthermore, it should be noted that by connector is meant any connecting device of two fibers or more, such as optical couplers or duplexers.

The support 22C is bordered preferably vertically by U-sections forming a gutter on both its faces. Two gutters 229e and 229s are soldered along the minor base of the support, and two gutters 230e and 230s are soldered along the major base of the support. As shown in FIG. 3, the gutters 229e and 230e are facing one another and located on the rear face of the support 22C to constitute a first case receiving the Fe incoming fiber loops, and the gutters 229s and 230s are facing one another and located on the front face of the support 22C to constitute a second case receiving the Fs outgoing fiber loops. The support 22C also comprises two pairs of vertically aligned cores 228e and 228s which are respectively disposed mid-way between the minor and major vertical bases of the support. The cores 228e are respectively located in the upper and lower portions of the rear case, and the cores 228s are respectively disposed in the upper and lower portions of the front case. Each of the cores is circular and can be of either cylindrical or spherical cap shape. The purpose of the two cores and the two gutters on the same face of the support 22 which cooperate to form a case, is to receive short overlengths of optical fibers Fe and Fs and to maintain each of the fibers substantially in a spare loop which is available near the connectors 224.

As shown in FIG. 1, fibers Fe and Fs come from storing compartments 67 located under the supports 22A, 22B and 22C, and are channelled up along the respective gutters 229s and 229e to be coiled in the respective cases. In this way, an outgoing fiber Fs channelled up along the gutter 229s is coiled by going around the two-core 228s arrangement before finally exiting through the upper portion of the corresponding front case, going around the upper end of the gutter 230s and reaching a semi-connector 224s. After having passed along the gutter 229e, an incoming fiber Fe passes around the upper core 228e, then descends diagonally into the corresponding rear case to pass around the lower end of the lower core 228e and the lower end of the gutter 230e before passing up towards a corresponding semi-connector 224e. Preferably, the incoming optical fibers Fe reach the semi-connectors 224e by passing through a flattened horizontal grouping ring 21 of which the lower end is attached to the major base of the support 22C. However, it should be noted that the incoming fibers like the outgoing fibers can be looped several times in the respective rear and front cases so as to form large spare sections of fiber. The spare loops are thus protected against aggression from without and against undue bending in an extremely reduced volume comprised by the two cases on either side of the support 22C.

In the illustrated embodiment, a storing space for spare fiber loops is advantageously provided under the supports 22A, 22B and 22C. As shown in FIGS. 1 and 2, this storing space is comprised of the horizontally disposed compartments 67 located near spreading heads 53e and 53s for incoming Ce and outgoing Cs cables. Each spreading head 53e, 53s, is attached to the lower portion of the box 6 containing the compartments and, preferably, to the lower sidewall 62 of the box 6. A spreading head may be such as those disclosed in U.S. Pat. No. 4,795,230. According to this patent, the optical fibers spread-out from a head are channelled towards connectors 224 in flexible protective tubes or jackets in elastomer. Though the invention refers to all types of optical fibers, multimode or monomode, the aforesaid flexible protective jackets are used in particular for monomode fibers of small dimension by comparison with that of the jackets.

Typically, there are four compartments 67 formed between five parallel bulkheads 671, substantially horizontal. Each compartment 67 receives several spare loops of several fibers Fe, Fs coiled according to appropriate radius bends. The coiled fibers are then extracted from each compartment 67 to be guided vertically by means of a hole 670 which is made at least in the upper bulkhead 671 and which ensures distribution along the gutters 229e and 229s towards the cases on the sides of the supports 22A, 22B and 22C, as shown in FIG. 2.

It should be noted that the fiber loops in the cases of supports 22A, 22B and 22C are particularly designed to provide fiber overlengths during manipulation of fibers to prepare their ends and to insert them in the connectors 224. On the other hand, the fiber loops stored in the compartments 67 are not only used to make long fiber overlengths available but also to enable translation and rotation of the supports and compartments, as will be seen further on.

As shown schematically in FIG. 1, a central rod 7 extends vertically in the box 6 and connects together the three supports and the three compartment bulkheads 67. Over the upper bulkhead 671, the rod 7 comprises an arm 71, or several arms, at the ends of which are mounted the articulation axes A of the three supports 22A, 22B and 22C. At the lower part, the rod 7 crosses the bulkheads 671 which are soldered to the rod 7, and can be used as an axis to coil the fibers in the compartments 67.

The assembly of the supports 22A, 22B and 22C and the bulkheads 671 is extractable from the box 6 by means of two sets of slides 66 and sliding rails 660 disposed horizontally and perpendicular to the wall M on which the major rear face 60 of the box is hung, as shown in FIG. 3. The sliding rails 660, which are possibly telescopic, are attached to the inside of the box 6 and transversely to the minor upper 63 and lower 62 sidewalls of the box. The sliding rails 660 are typically T-sections or cut-in dovetail and are symmetric around a horizontal plane. The profile of the slides 66 is complementary to that of the sliding rails 660 and slides along the latter. Adequate stops provided at the ends of the sliding rails limit the travel of the slides 66 in such a way that the assembly of the supports and compartments can be completely removed to the outside of the box. The slides 66 are respectively attached to the lower and upper ends of the central rod 7 supporting the supports 22A, 22B and 22C as well as the bulkheads 671.

However, the ends of the rod 7 are rotationally mounted between the slides 66. A small rule 68 to maintain and guide the supports 22A, 22B and 22C can be provided at the upper end of the turning rod 7, this rule 68 being rotatively attached beneath the upper slide 66. Likewise, a small rule equipped with an arm 71 can be provided to receive the articulation axes A of the supports.

Figure 4:
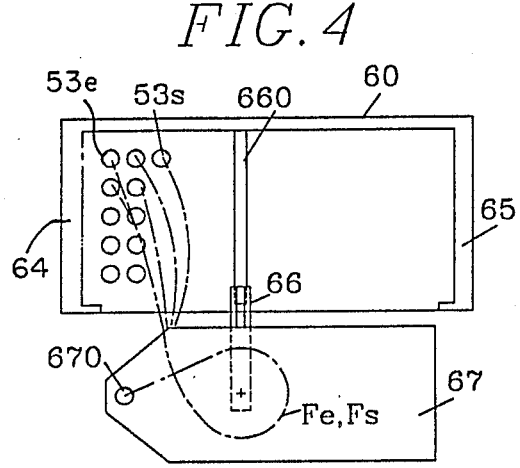
FIG. 4 is a similar view to FIG. 2, after sliding of the fiber spare loops towards the outside of the box.
Figure 5:
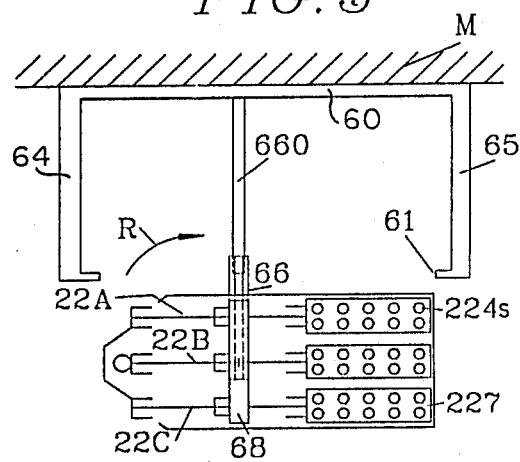
FIG. 5 is a similar view to FIG. 3 and complementary to FIG. 4, after sliding of the case and connector supports towards the outside of the box.

As shown in FIGS. 2 and 3, the supports 22A, 22B and 22C are laid out side by side in the box 6 and parallel with the wall M and the rear face of the box forming the bottom of the box. These supports with the compartments 67 are extracted from the box 6 by sliding of the slides 66 along the sliding rails 660 perpendicular to the wall M. Extraction is carried out according to the direction indicated by the arrow T in FIG. 3, and via the open front face 61 of the box 6 situated opposite the wall M. As previously stated, this face 62 can be closed by a cover which is either removable from the box or articulated with one of the sidewalls 62 to 65 of said box. After sliding the slides towards the outside, the assembly of the supports 22A, 22B and 22C and compartments 67 reaches a position completely outside the box 6, as shown in FIGS. 4 and 5. Each of the optical fibers Fe, Fs also has one or more loops of slightly smaller dimension that that shown in FIG. 2, but according to a bending radius greater than the critical diameter, in the respective compartment 67. In fact, the fiber spare loops enable a certain overlength of fiber to be provided so as to displace all the supports and compartments to the outside of the box. At this stage, though the supports 22A, 22B and 22C are completely outside the box 6, the cases and connectors 224 are not accessible or, at least, are not directly visible to an operator facing the open face 61 of the box 6, since the supports are stacked vertically.

Figure 6:
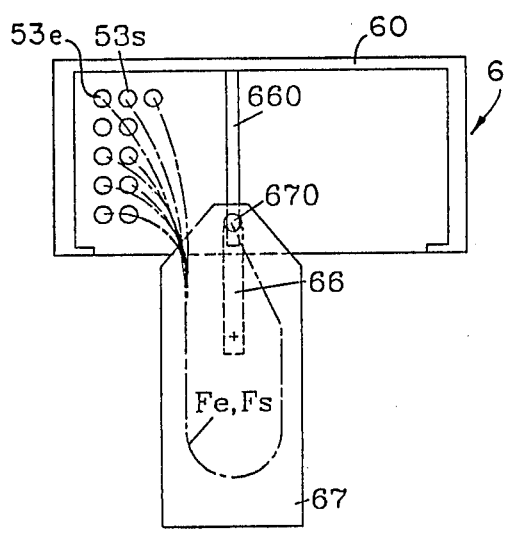
FIG. 6 is a similar view to Figs. 2 and 4, after rotation of the spare fiber compartments towards the outside of the box.
Figure 7:
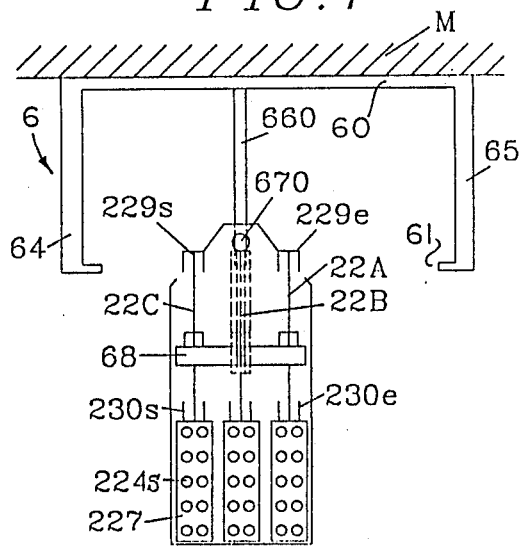
FIG. 7 is a similar view to Figs. 3 and 5 and complementary to FIG. 6, after rotation of the case and connector supports towards the outside of the box.

All the supports 22A, 22B and 22C and all the compartments 67 then pivot through 90° by axial rotation of the rod 7, between the slides 66, as indicated by the arrow R in FIG. 5. As shown in FIGS. 6 and 7, at the end of this rotation, the group of three supports 22A, 22B and 22C and the connector-holders 227 are perpendicular to the face 60 and to the wall M. The connector-holders 227 are facing the operator.

In the previous condition of the compartments and supports, as shown in FIG. 6, each of the fibers Fe, Fs in the compartments 67 has at least one loop slackened from the corresponding spreading head 53e, 53s by comparison with the loop shown in FIG. 4. Moreover, access is difficult despite the fact that the connectors 224 are facing the operator according to FIG. 7, particularly the connectors 224 situated near the gutters 230e and 230s, now in front of the supports. Furthermore, for fiber connecting operations, the fiber loops situated in the cases, particularly between the lateral supports 22A and 22C, are not accessible. On the other hand, the inside of the box 6 is devoid of support, and particularly the rear face 60 and the sidewall 62 which can bear spreading heads 53e and 53s, are easily accessible.

A third operating stage is therefore required to clear away a selected support 22A, 22B or 22C from the others so as to modify or prepare a connection as regards a connector 224 supported by the selected support. This third stage consists in pivoting the selected support frontwards, such as the support 22B shown in FIG. 8, around the respective axis A which, in practice, can be a pivoting axis that is common to all the supports 22A, 22B and 22C. At the end of this 90° pivoting according to the arrow P indicated in FIG. 8, the support 22B is projected out from the other supports 22A and 22C and shows gutters 229e, 230e and 229s, 230s perpendicular to box faces 60 and 61 and to the wall M. In particular, the connectors 224 under the gutters 230e and 230s of the pivoted support 22B are disposed horizontally and completely cleared away from the other rows of connectors on the supports 22A and 22C, which facilitates handling of the semi-connectors 224e and 224s borne by the support 22B ; also, the lateral sides of the support 22B are completely freed from the supports ZZA and 22C and project out in front of these, which makes the fiber loops in the cases 229e, 230e and 229s, 230s of the support 22B easily accessible.

Figure 8:
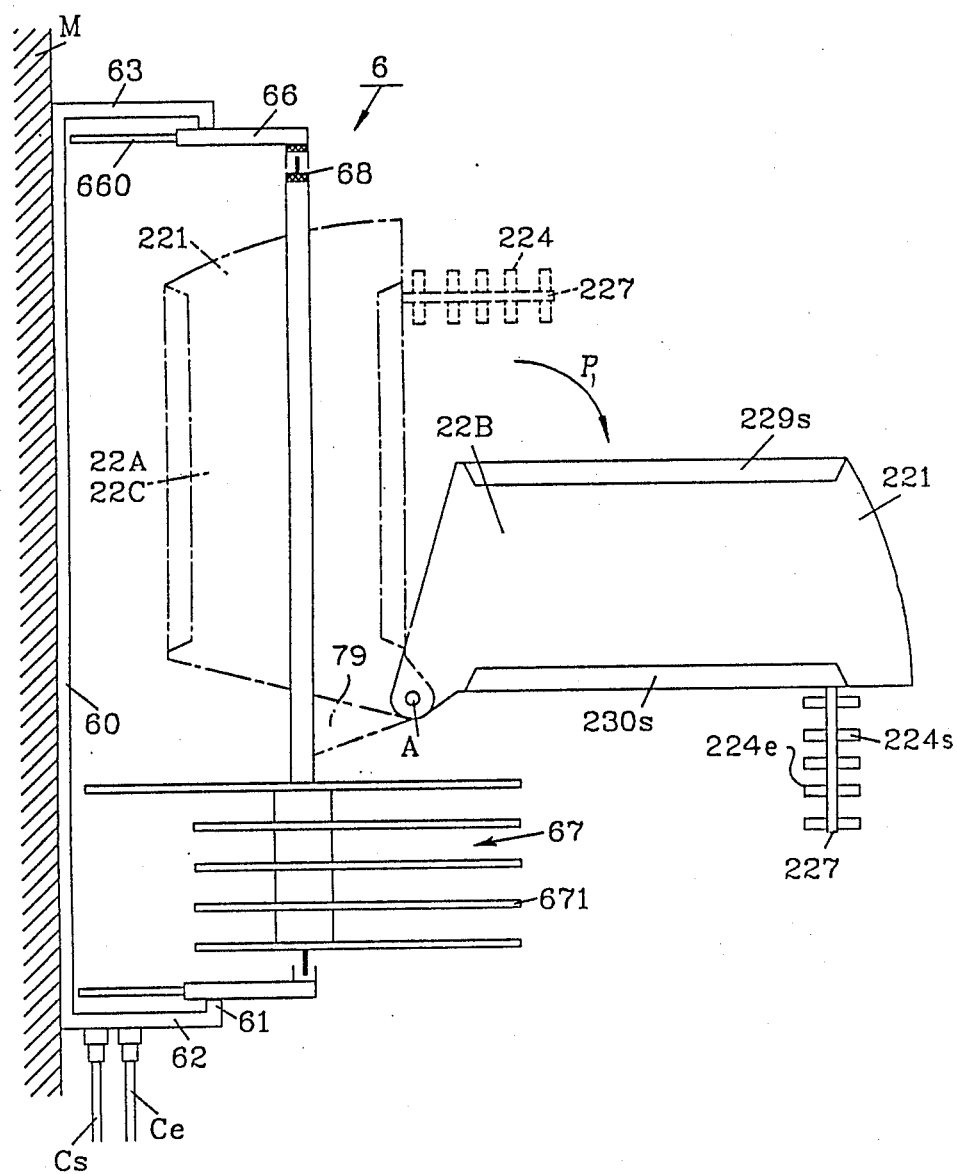
FIG. 8 is a vertical side view, after sliding towards the outside and rotation on the outside of all the supports and compartments, and after pivoting of one of the supports.

It should be noted that each of the supports 22A, 22B and 22C is trapezoidal, and in particular, the small transversal upper edge 221 of the support opposite the pivoting axis is an arc of a circle of center A, as shown in FIGS. 1 and 8. This feature enables the support to be slid beneath the small rule 68 during pivoting P, thereby reducing the height of the box 6 compared with a rectangular support of the same height.

Opposite operations to those previously mentioned are carried out after the connecting of fibers Fs to fibers Fe and/or modifying the existing connections and, if necessary, returning the support 22B by pivoting to the position shown in FIG. 7, and pivoting of one or more supports. For example, from the situation shown in FIG. 8, the support 22B is pivoted through 90° in the opposite direction to that indicated by the arrow P, then the assembly of the supports 22A, 22B and 22C and compartments 67 is simultaneously rotated in the opposite direction to that indicated by the arrow R to be positioned as shown in FIGS. 4 and 5, and finally, the assembly is pushed inside and towards the rear face 60 of the box in the opposite direction to that indicated by the arrow T, and preferably, the front face 61 is closed by the cover of the box.

WHAT WE CLAIM IS:

1. A module for distributing and connecting first and second optical fibers, said module comprising a box with an openable front face, plural fiber loop supports substantially flat and movable which are laid out parallel with said front face of the box, plural means respectively attached to the supports for connecting said first optical fibers to said second optical fibers respectively, translating means slidably mounted in said box for translating said supports together substantially perpendicular to said front face, from the inside to the outside of said box, and turning means rotatively mounted on said translating means, for turning said supports together towards the outside of said box and around an axis of rotation substantially parallel with said front face, each of said supports being pivotably mounted on said turning means around a pivoting axis perpendicular to said support.

2. The module claimed in claim 1, wherein said translating means comprises a slide connected to all said supports by means of said turning means and slidably mounted on a sliding rail which is attached to the inside of said box and is perpendicular to said front face.

3. The module claimed in claim 2, wherein said turning means comprises a rod having an end mounted rotatively on said slide, respectively, one of the ends of said rod being equipped with an arm receiving said pivoting axis perpendicular to the rod.

4. A module as claimed in claim 1, and further comprising means attached to said turning means for storing fiber spare loops.

5. The module claimed in claim 4, wherein said storing means comprises parallel bulkheads, disposed perpendicular to said front face of said box and to said supports.

6. The module claimed in claim 4, wherein said axis of rotation is disposed perpendicular to two parallel sidewalls of said box which are perpendicular to said front face, and when laid out together with said supports in said box, said storing means are disposed just above one of said sidewalls, said supports being located just below the other sidewall.

7. The module claimed in claim 6, wherein said fibers are spread out in said box in the direction of said storing means by means of spreading heads attached to said box and connected to optical fiber cables.

8. The module claimed in claim 1, wherein each of said supports comprises pairs of gutters facing one another and, respectively, bordering two parallel edges of the faces of said support so as to constitute two cases receiving loops of said first and second fibers.

9. The module claimed in claim 8, wherein each case comprises two cores attached to the respective face of said support and aligned substantially parallel with said gutters to facilitate coiling of said fibers into loops.

10. The module claimed in claim 1, wherein said connecting means attached to one of said supports comprises a fiber-to-fiber connector bar substantially located on the plane of said support and attached perpendicular to an edge of said support.

11. The module claimed in claim 10, wherein said connector bar is attached to an end of said edge of said support, and said pivoting axis of said support is located near the other end of said edge.

12. The module claimed in claim 11, wherein connectors extend parallel with said support edge in at least one row perpendicular to said edge.

13. The module claimed in claim 1, wherein each of said supports is substantially quadrilateral and said pivoting axis traverses a corner of said support.

14. The module of claim 13 wherein each of said supports is substantially isosceles trapezoidal.

15. The module claimed in claim 4, wherein each of said supports is substantially quadrilateral and has a corner that is crossed by said pivoting axis and located near said fiber spare loop storing means.

* * * * *